US012436193B2

(12) United States Patent
Kurokawa

(10) Patent No.: US 12,436,193 B2
(45) Date of Patent: Oct. 7, 2025

(54) MONITORING DEVICE, MONITORING SYSTEM, AND MONITORING METHOD FOR RELAY OUTPUT SIGNAL

(71) Applicant: FANUC CORPORATION, Yamanashi (JP)

(72) Inventor: Yuuki Kurokawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 132 days.

(21) Appl. No.: 18/276,801

(22) PCT Filed: Apr. 13, 2021

(86) PCT No.: PCT/JP2021/015287
§ 371 (c)(1),
(2) Date: Aug. 10, 2023

(87) PCT Pub. No.: WO2022/219708
PCT Pub. Date: Oct. 20, 2022

(65) Prior Publication Data
US 2024/0125852 A1    Apr. 18, 2024

(51) Int. Cl.
*G01R 31/327*    (2006.01)
(52) U.S. Cl.
CPC ................. *G01R 31/3278* (2013.01)
(58) Field of Classification Search
CPC ................................. G01R 31/3278
See application file for complete search history.

(56) References Cited

U.S. PATENT DOCUMENTS 9,239,572 B2 * 1/2016 Korrek .................. G05B 9/02
10,777,992 B2 * 9/2020 Blumschein ....... G01R 31/3333

FOREIGN PATENT DOCUMENTS

| JP | 4-367003 | 12/1992 |
|---|---|---|
| JP | 2008-091804 | 4/2008 |
| JP | 2009-25141 | 2/2009 |

(Continued)

OTHER PUBLICATIONS

International Search Report issued Jun. 22, 2021 in International (PCT) Application No. PCT/JP2021/015287.

*Primary Examiner* — Walter L Lindsay, Jr.
*Assistant Examiner* — Milton Gonzalez
(74) *Attorney, Agent, or Firm* — Wenderoth, Lind & Ponack, L.L.P.

(57) ABSTRACT

A monitoring device monitors an abnormality in number of times of repetition of opening/closing of an output signal of a relay, and identifies a cause of the abnormality if the abnormality in number of times of repetition of opening/closing of the output signal of the relay is detected. This monitoring device includes an output signal monitoring unit that monitors an abnormality in number of times of repetition of opening/closing of an output signal of a relay, and a cause identification unit that identifies a cause based on periodicity of repetition of opening/closing if the output signal monitoring unit has detected an abnormality in number of times of repetition of opening/closing. The relay is opened/closed based on a control signal received from a numerical control device, and the cause identification unit may determine occurrence of an abnormality in the control signal if periodicity of repetition of opening/closing is detected.

8 Claims, 3 Drawing Sheets

(56) References Cited

FOREIGN PATENT DOCUMENTS

| JP | 2012-195322 | 10/2012 |
| JP | 2015-217911 | 12/2015 |
| JP | 2017-151677 | 8/2017 |
| JP | 2017-187878 | 10/2017 |
| JP | 2018-95022 | 6/2018 |

* cited by examiner

MONITOR NUMBER OF TIMES OF CHANGE IN LEVEL OF SIGNAL IN A FIXED PERIOD OF TIME T

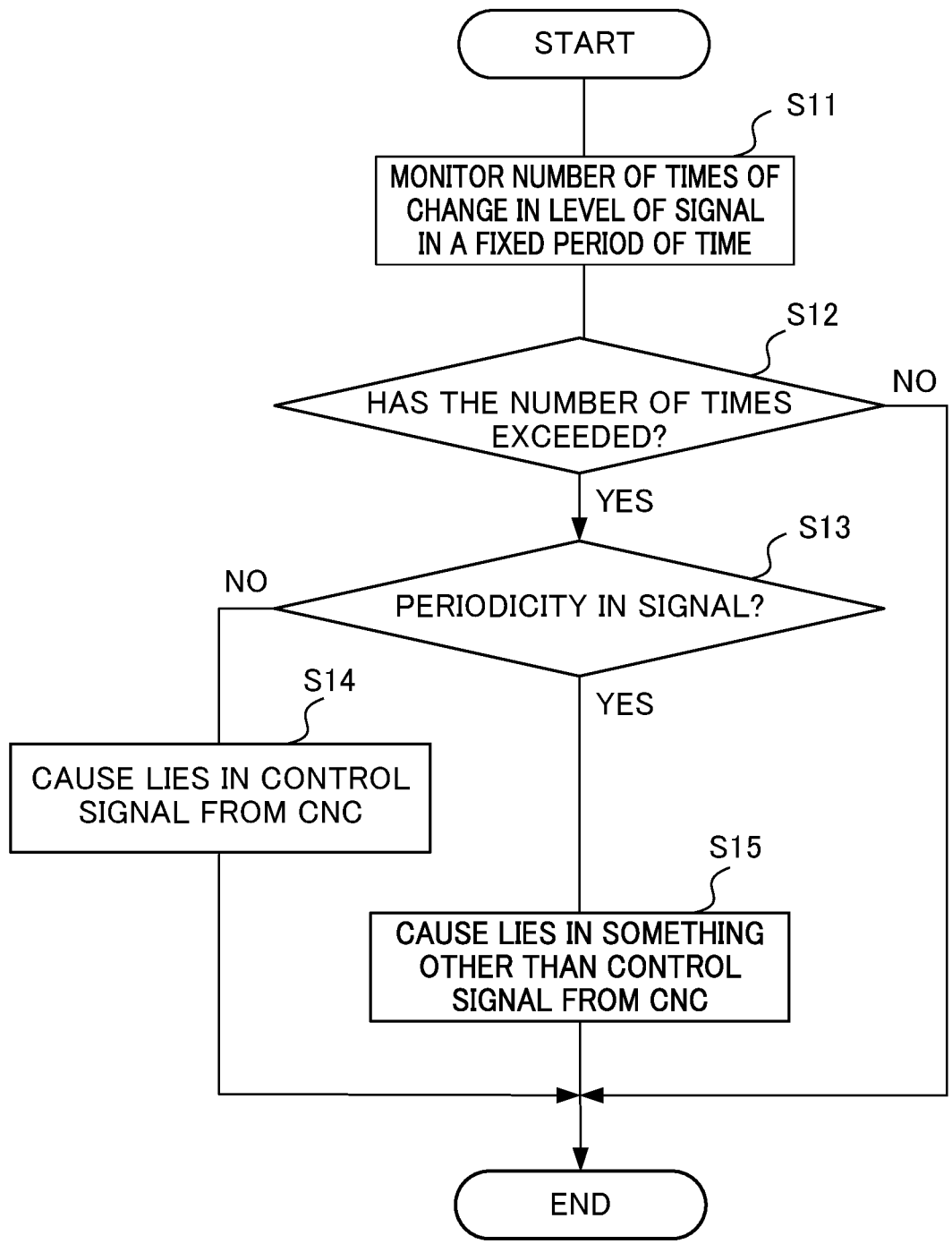

MONITORING DEVICE, MONITORING SYSTEM, AND MONITORING METHOD FOR RELAY OUTPUT SIGNAL

TECHNICAL FIELD

The present invention relates to a monitoring device, a monitoring system, and a monitoring method for a relay output signal, and more particularly, to a monitoring device, a monitoring system, and a monitoring method for monitoring an abnormality in the number of times of the repetition of opening and closing of a relay output signal, and identifying a cause of the abnormality when the abnormality in the number of times of the repetition of opening and closing of a relay output signal is detected.

BACKGROUND ART

In a relay output module including a relay, contacts of the relay may be repeatedly opened and closed in a short period of time, and the contacts may be welded by continuous arc heat. The reason why an abnormality occurs in the number of times of the repetition of opening and closing of the output signal (relay output signal) of the relay is, for example, vibration in the relay output module, a decrease in the coil applied voltage, and an abnormality in the control signal from the computer numerical controller (CNC).

A device for detecting repetition of opening and closing of a switch in a short period of time is described, for example, in Patent Document 1. In the Patent Document 1, the signal inspection device includes an acquisition unit that acquires a value of two or more signals among the multiplexed signals in a fixed cycle, a counting unit that counts the number of times of change in each of the two or more signals in a predetermined period of time, a calculation unit that calculates a difference between the number of times of change, and an output unit that outputs an output indicating a mismatch of signals when the difference between the number of times of change exceeds an allowable value. The output unit can output a signal indicating a signal having a number of times of change larger than that of the other signals, thereby detecting a signal abnormality in a short cycle.

Also, for example, Patent Document 2 discloses an abnormality detection circuit that automatically performs abnormality detection of a sequence control circuit regardless of visual confirmation. Patent Document 2 describes that an order of change of input/output signals when a sequence control circuit operates normally is stored in internal memory in a CPU in an abnormality detection circuit, and every time a change of a signal content of the input/output signals is detected by the CPU, it is checked that the changed input/output signals are in accordance with the order of change of the input/output signals stored in the internal memory such that operation of the sequence control circuit is confirmed.

Patent Document 1: Japanese Unexamined Patent Application, Publication No. 2017-151677
Patent Document 2: Japanese Unexamined Patent Application, Publication No. H04-367003

DISCLOSURE OF THE INVENTION

Problems to be Solved by the Invention

The occurrence of repetition of opening and closing of the relay in a short period of time can be confirmed by taking the waveform of the output signal of the relay using an oscilloscope. However, when the control signal from the CNC or the like is abnormal due to noise or vibration of the machine, the phenomenon is temporary, so that measurement is difficult. Therefore, even if the phenomenon is temporary, it has been demanded to be able to monitor whether or not an abnormality occurs in the number of times of the repetition of opening and closing of the output signal of the relay. Furthermore, when an abnormality occurs in the number of times of the repetition of opening and closing of the output signal of the relay, it has been demanded to be able to specify the cause of the abnormality.

Means for Solving the Problems (1) According to a first aspect of the present disclosure, a monitoring device includes: an output signal monitoring unit that monitors an abnormality in a number of times of repetition of opening and closing of an output signal of a relay; and a cause identifying unit that, when the output signal monitoring unit detects the abnormality in the number of times of repetition of the opening and closing, identifies a cause of the abnormality based on a periodicity of the repetition of the opening and closing.

(2) According to a second aspect of the present disclosure, a monitoring system includes: a monitoring device according to the first aspect; a relay output module that is connected to the monitoring device, includes a relay, and outputs an output signal of the relay to the monitoring device; and a load that is connected to the monitoring device and to which the output signal of the relay is outputted from the monitoring device.

(3) According to a third aspect of the present disclosure, a monitoring method includes the steps of: a relay output module including a relay outputting an output signal of the relay; and a monitoring device monitoring an abnormality in a number of times of repetition of opening and closing of an output signal of the relay, and when the monitoring device detects the abnormality in the number of times of repetition of the opening and closing, identifying the cause of the abnormality based on a periodicity of the repetition of the opening and closing.

Effects of the Invention

According to each aspect of the present disclosure, it is possible to monitor an abnormality in the number of times of the repetition of opening and closing of the output signal of the relay, and to identify a cause of the abnormality when the abnormality in the number of times of the repetition of opening and closing of the output signal of the relay occurs.

BRIEF DESCRIPTION OF THE DRAWINGS

FIG. 4 is a flowchart showing the operation of the monitoring device.

PREFERRED MODE FOR CARRYING OUT THE INVENTION

Hereinafter, an embodiment of the present invention will be described in detail with reference to the accompanying drawings.

First Embodiment

Figure 1:
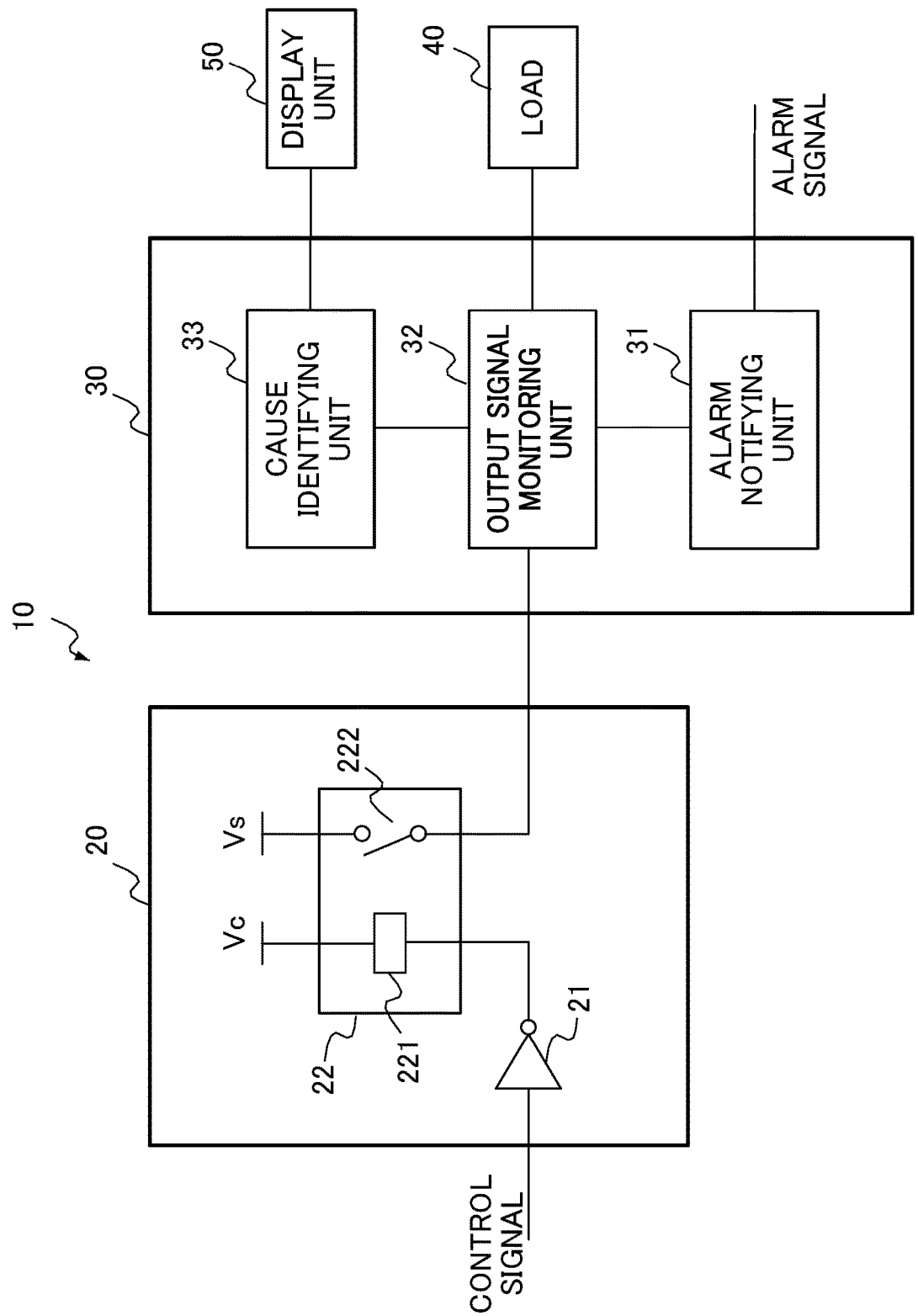
FIG. 1 is a block diagram showing a configuration example of a monitoring system according to a first embodiment of the present disclosure.

FIG. 1 is a block diagram showing a configuration example of a monitoring system according to a first embodiment of the present disclosure.

As shown in FIG. 1, a monitoring system 10 includes a relay output module 20, a monitoring device 30, a load 40, and a display unit 50. The display portion 50 may not be provided. The relay output module 20 includes an inverter 21 and a relay 22. A control signal is inputted to the inverter 21 from a computer numerical controller (CNC) serving as a numerical controller. The inputted control signal is inverted by the inverter 21 and inputted to the relay 22. The relay 22 includes a coil 221 and a contact portion 222. The current flowing through the coil 221 is on/off controlled by the inverted control signal, and electromagnetic force is exerted by this current, whereby the contact portion 222 is controlled to be closed. The relay 22 outputs a relay output signal generated by opening and closing the contact portion 222 to the monitoring device 30.

The monitoring device 30 includes an alarm notifying unit 31, an output signal monitoring unit 32, and a cause identifying unit 33. The monitoring device 30 is connected between the relay output module 20 and the load 40, such as a valve or light.

Figure 2:
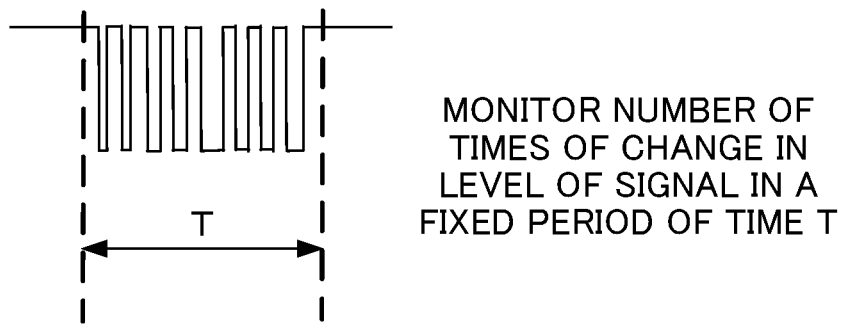
FIG. 2 is a waveform diagram showing a monitoring state of the number of times of change in the level of a relay output signal within a fixed period of time.

The output signal monitoring unit 32 monitors an abnormality (high frequency opening/closing in a short period of time) in the number of times of the repetition of opening/closing (on/off) of the output signal (relay output signal) of the relay 22. For example, as shown in FIG. 2, the output signal monitoring unit 32 monitors whether or not the number of times of change in the level of the relay output signal from the ON state to the OFF state or from the OFF state to the ON state of the relay output signal within a fixed period of time T exceeds a threshold value. The fixed period of time T is set in consideration of the type of relay, the update cycle of the control signal of the CNC, and the like. The threshold value is set in consideration of the type of relay and the like. The fixed period of time T and the threshold value are set in consideration of the type of relay, because the number of times of the repetition of opening and closing and the duration of repetition in a short period of time, which occur in the contact portion of the relay until the relay reaches welding, are different depending on the type of relay. The output signal monitoring unit 32 stores a relay output signal in the fixed period of time T.

When the number of times of change in the level of the relay output signal within the fixed period of time T exceeds the threshold value, the output signal monitoring unit 32 determines that the number of times of the repetition of the opening and closing of the output signal of the relay 22 is abnormal, and outputs the stored relay output signal within the fixed period of time to the cause identifying unit 33. The output signal monitoring unit 32 outputs an alarm instruction command to the alarm notifying unit 31. Upon receipt of the alarm instruction command, the alarm notifying unit 31 outputs an alarm signal to an alarm generating unit such as an LED or a speaker (not shown). The alarm notifying unit 31 may be appropriately provided as necessary, and may not be provided. The alarm notifying unit 31 may output an alarm display signal to the display unit 50. The method of monitoring whether or not the number of times of the repetition of opening and closing of the output signal (relay output signal) of the relay 22 by the output signal monitoring unit 32 is abnormal is not particularly limited to the above method, and other monitoring methods may be used.

Figure 3:
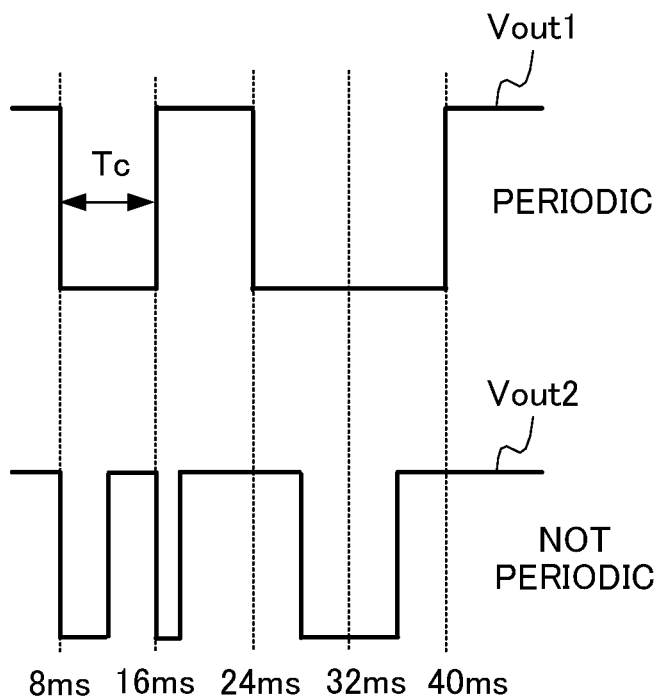
FIG. 3 is a diagram showing two examples of relay output signals in which an abnormality occurs in the number of times of the repetition of opening and closing.

The cause identifying unit 33 identifies the cause of an abnormality (high frequency opening/closing in a short period of time) in the number of times of the repetition of opening/closing (on/off) of the output signal of the relay 22. More specifically, the cause identifying unit 33 monitors the cycle of the change in the level of the relay output signal for a fixed period of time. When the control signal from the CNC inputted to the relay output module 20 is abnormal and there is no abnormality in the relay output module 20, the timing of the change in the level of the relay output signal depends on the update cycle of the control signal from the CNC and has a periodicity. Therefore, when there is a periodicity in the timing of the change in the level of the relay output signal, the cause identifying unit 33 determines that the control signal from the CNC is abnormal. For example, the relay output signal Vout1 shown in FIG. 3 has periodicity because the relay output signal Vout1 opens and closes corresponding to the update period Tc (Tc=8 msec) of the CNC, and it is determined that the control signal from the CNC is abnormal as a cause of abnormality in the number of times of the repetition of opening and closing.

On the other hand, when the timing of the change in the level of the relay output signal does not depend on the update cycle of the control signal from the CNC, the cause identifying unit 33 determines that the control signal from the CNC is not abnormal, and that the cause of the abnormality in the number of times of the repetition of opening and closing is another cause, for example, an abnormality caused by the relay output module 20 (for example, an abnormality due to a coil applied voltage or vibration). For example, since the relay output signal Vout2 shown in FIG. 3 does not open and close corresponding to the update cycle Tc (Tc=8 msec) and has no periodicity, the cause identifying unit 33 determines that the control signal from the CNC is not abnormal, and that the cause of the abnormality is other causes other than the control signal from the CNC, for example, an abnormality caused by the relay output module 20 (for example, an abnormality due to a coil applied voltage or vibration).

When the cause identifying unit 33 specifies the cause of the abnormality in the number of times of the repetition of opening and closing, the cause identifying unit 33 displays the specified cause on the display unit 50 such as a liquid crystal display device. For example, when the cause of the abnormality in the number of times of the repetition of opening and closing lies in the control signal from the CNC, the display unit 50 displays that "the cause of the abnormality in the number of times of the repetition of opening and closing is the control signal from the CNC", and when the cause of the abnormality in the number of times of the repetition of opening and closing lies in the relay output module (for example, a coil applied voltage or vibration), the display unit 50 displays that "the cause of the abnormality in the number of times of the repetition of opening and closing is the relay output module (for example, a coil applied voltage or vibration)". When receiving an alarm display signal from the alarm notifying unit 31, the display unit 50 displays that "abnormality in the number of times of the repetition of opening and closing occurs". The display unit 50 may display this display together with the above-described display indicating the cause of the abnormality in the number of times of the repetition of opening and closing.

According to the monitoring device of the embodiment described above, it is possible to monitor whether or not an abnormality in the number of times of the repetition of opening and closing occurs in the relay output signal. Furthermore, it is possible to distinguish whether or not the cause of the abnormality in the number of times of the repetition of opening and closing is due to the abnormality in the control signal from the CNC. Then, when the cause of the abnormality in the number of times of the repetition of opening and closing is not due to the abnormality in the control signal from the CNC, it can be determined that the other cause is due to, for example, the abnormality caused by the relay output module 20 (abnormality due to a coil applied voltage or vibration).

The functional blocks included in the monitoring device 30 have been described above. In order to realize these functional blocks, the monitoring device 30 includes an arithmetic processing unit such as a CPU (Central Processing Unit). Furthermore, the monitoring device 30 also includes an auxiliary storage device such as an HDD (Hard Disk Drive) in which application software and various control programs such as an OS (Operating System) are stored, and a main storage device such as RAM (Random Access Memory) in which data temporarily required for the arithmetic processing device to execute a program is stored.

Then, in the monitoring device 30, the arithmetic processing device reads application software or the OS from the auxiliary storage device, and performs arithmetic processing based on the application software or the OS while developing the read application software or the OS in the main storage device. Furthermore, based on the calculation result, various kinds of hardware included in each device are controlled. Thus, the functional blocks of the monitoring device 30 of the present embodiment are implemented. That is, the present embodiment can be implemented by the cooperation of hardware and software.

Hereinafter, the operation of the monitoring device 30 will be described with reference to FIG. 4. FIG. 4 is a flowchart showing the operation of the monitoring device 30.

In Step S11 of FIG. 4, the output signal monitoring unit 32 monitors the number of times of change in the level of the relay output signal from ON to OFF or from OFF to ON within a fixed period of time. In Step S12, the output signal monitoring unit 32 determines whether or not the number of times of change in the level does not exceed a threshold value. When the number of times of change in the level exceeds the threshold value, the processing advances to Step S13. When the number of times of change in the level does not exceed the threshold value, the processing ends.

In Step S13, the cause identifying unit 33 determines the periodicity of the timing of the change in the level of the relay output signal. When there is a periodicity in the timing of the change in the level of the relay output signal, the cause identifying unit 33 identifies, in Step S14, that the cause of an abnormality (high frequency opening/closing in a short period of time) in the number of times of the repetition of opening/closing is due to a cause of an abnormality in the control signal from the CNC.

On the other hand, when there is no periodicity in the timing of the change in the level of the relay output signal, the cause identifying unit 33 identifies, in Step S15, that the control signal from the CNC is not abnormal and the abnormality is due to other causes other than the control signal from the CNC, for example, an abnormality caused by the relay output module 20 (for example, an abnormality due to a coil applied voltage or vibration).

Although an embodiment according to the present invention has been described above, the respective components included in the monitoring device 30 can be implemented by hardware, software, or a combination thereof. Furthermore, the monitoring method performed by the cooperation of the respective components included in the monitoring device 30 can also be implemented by hardware, software, or a combination thereof. Here, "implemented by software" indicates that it is realized by a computer reading and executing a program.

The program can be stored and supplied to the computer using various types of non-transitory computer-readable recording media (non-transitory computer readable medium). Non-transitory computer readable storage media include various types of tangible storage media. Examples of non-transitory computer-readable recording media include magnetic recording media (e.g., hard disk drives), magneto-optical recording media (e.g., magneto-optical disks), CD-ROM (Read Only Memory), CD-R, CD-R/W, and semiconductor memory (for example, mask ROM, PROM (programmable ROM), EPROM (erasable PROM), flash ROM, and RAM (random access memory).

Although the above-described embodiment is a preferred embodiment of the present invention, the scope of the present invention is not limited to the above-described embodiment, and various modifications can be made without departing from the gist of the present invention.

The monitoring device, the monitoring system, and the monitoring method for the relay output signal according to the present disclosure can assume various embodiments having the following configurations, including the embodiment described above.

(1) A monitoring device (for example, the monitoring device 30) includes: an output signal monitoring unit (for example, the output signal monitoring unit 32) that monitors an abnormality in a number of times of repetition of opening and closing of an output signal of a relay (for example, the relay 22); and a cause identifying unit (for example, the cause identifying unit 33) that, when the output signal monitoring unit detects the abnormality in the number of times of repetition of the opening and closing, identifies a cause of the abnormality based on a periodicity of the repetition of the opening and closing. According to this monitoring device, it is possible to monitor the abnormality in the number of times of the repetition of the opening and closing of the output signal of the relay, and to identify the cause of an abnormality when the abnormality in the number of times of the repetition of opening and closing of the output signal of the relay occurs.

(2) In the monitoring device according to (1), the relay is opened and closed based on a control signal from a numerical controller, and the cause identifying unit determines that, when there is a periodicity in the repetition of the opening and closing of the output signal, the cause of the abnormality lies in the control signal.

(3) In the monitoring device according to (2), the relay is included in a relay output module (for example, the relay output module 20), and the relay output module is connected to the numerical controller, and the cause identifying unit determines that, when there is no periodicity in the repetition of the opening and closing of the output signal, the cause of the abnormality lies in the relay output module.

(4) In the monitoring device according to any one of (1) to (3), the output signal monitoring device determines that, when the number of times of repetition of the opening and closing of the output signal of the relay in a fixed period of time exceeds a threshold value, the cause of the abnormality lies in an abnormality in the repetition.

(5) The monitoring device according to any one of (1) to (4), further includes an alarm notifying unit that notifies an alarm when the output signal monitoring unit detects the abnormality in the number of times of repetition of the opening and closing of the output signal.

(6) A monitoring system (for example, the monitoring system 10) includes: a monitoring device (for example, the monitoring device 30) according to any one of (1) to (5); a relay output module (for example, the relay output module 20) that is connected to the monitoring device, includes a relay, and outputs an output signal of the relay to the monitoring device; and a load that is connected to the monitoring device and to which the output signal of the relay is outputted from the monitoring device. According to this monitoring system, it is possible to monitor the abnormality in the number of times of the repetition of the opening and closing of the output signal of the relay, and to identify the cause of an abnormality when the abnormality in the number of times of the repetition of the opening and closing of the output signal of the relay occurs.

(7) The monitoring system according to (6), further includes a display unit that displays the cause of the abnormality in the number of times of the repetition of the opening and closing of the output signal of the relay, the cause of the abnormality being outputted from the monitoring device.

(8) A monitoring method includes: a relay output module (for example, the relay output module 20) including a relay outputting an output signal of the relay; and a monitoring device (for example, the monitoring device 30) monitoring an abnormality in a number of times of repetition of opening and closing of an output signal of the relay, and when the monitoring device detects the abnormality in the number of times of repetition of the opening and closing, identifying the cause of the abnormality based on a periodicity of the repetition of the opening and closing. According to this monitoring method, it is possible to monitor the abnormality in the number of times of the repetition of the opening and closing of the output signal of the relay, and to identify the cause of an abnormality when the abnormality in the number of times of the repetition of the opening and closing of the output signal of the relay occurs.

EXPLANATION OF REFERENCE NUMERALS

10 monitoring system
20 relay output module
30 monitoring device
31 alarm notifying unit
32 output signal monitoring unit
33 cause identifying unit
40 load
50 display unit

The invention claimed is:

1. A monitoring device comprising:
an output signal monitoring unit that monitors an abnormality in a number of times of repetition of opening and closing of an output signal of a relay; and
a cause identifying unit that, when the output signal monitoring unit detects the abnormality in the number of times of repetition of the opening and closing, identifies a cause of the abnormality based on a periodicity of the repetition of the opening and closing.

2. The monitoring device according to claim 1, wherein the relay is opened and closed based on a control signal from a numerical controller, and
the cause identifying unit determines that, when there is a periodicity in the repetition of the opening and closing of the output signal, the cause of the abnormality lies in the control signal.

3. The monitoring device according to claim 2, wherein the relay is included in a relay output module, and the relay output module is connected to the numerical controller, and
the cause identifying unit determines that, when there is no periodicity in the repetition of the opening and closing of the output signal, the cause of the abnormality lies in the relay output module.

4. The monitoring device according to claim 1, wherein the output signal monitoring device determines that, when the number of times of repetition of the opening and closing of the output signal of the relay in a fixed period of time exceeds a threshold value, the cause of the abnormality lies in an abnormality in the repetition.

5. The monitoring device according to claim 1, further comprising an alarm notifying unit that notifies an alarm when the output signal monitoring unit detects the abnormality in the number of times of repetition of the opening and closing of the output signal.

6. A monitoring system comprising:
a monitoring device according to claim 1;
a relay output module that is connected to the monitoring device, includes a relay, and outputs an output signal of the relay to the monitoring device; and
a load that is connected to the monitoring device and to which the output signal of the relay is outputted from the monitoring device.

7. The monitoring system according to claim 6, further comprising a display unit that displays a cause of an abnormality in a number of times of repetition of opening and closing of the output signal of the relay, the cause of the abnormality being outputted from the monitoring device.

8. A relay output signal monitoring method comprising the steps of:
outputting, by a relay output module including a relay, an output signal of the relay;
monitoring, by a monitoring device, an abnormality in a number of times of repetition of opening and closing of the output signal of the relay; and
identifying, by a cause identifying unit, the cause of the abnormality based on a periodicity of the repetition of the opening and closing, when the monitoring device detects the abnormality in the number of times of repetition of the opening and closing.

* * * * *